Patented Jan. 7, 1941

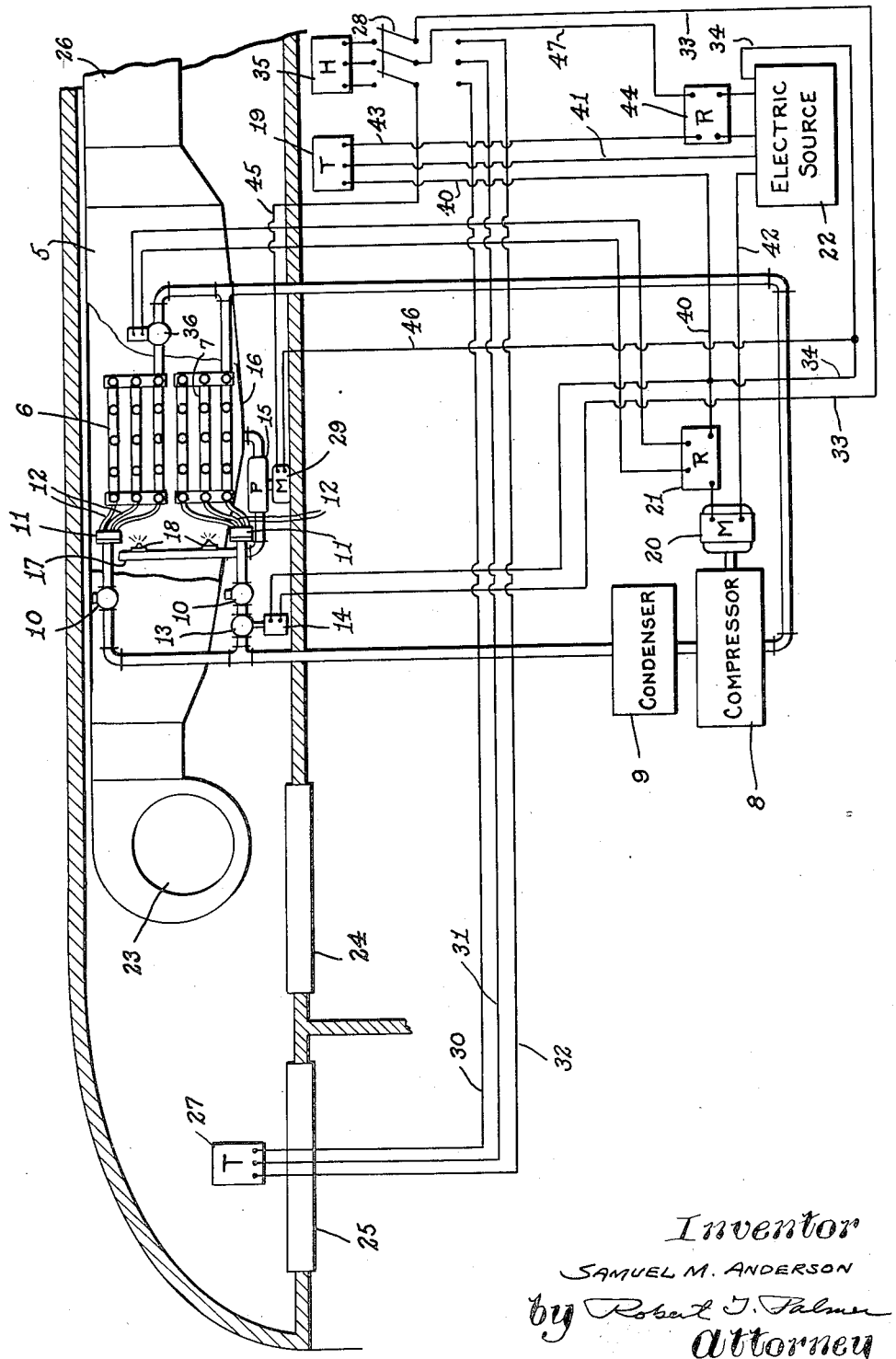

2,228,103

UNITED STATES PATENT OFFICE 2,228,103

REFRIGERATION CONTROL

Samuel M. Anderson, Sharon, Mass., assignor to B. F. Sturtevant Company, Boston, Mass.

Application November 17, 1938, Serial No. 240,994

10 Claims. (Cl. 62—6)

This invention relates to the control of refrigeration apparatus and relates more particularly to the automatic control of sprayed evaporators in an air conditioning system.

In air conditioning systems such for example as those in railway passenger cars, it has been proposed to cool the air with evaporator coils in the air stream with water sprayed upon the coils for washing them and also for washing the air. It was proposed to control such apparatus by a car thermostat which would start and stop both the water pump and the refrigerant compressor. This is believed to be undesirable for it is preferable to operate the sprays continuously for cleaning and sterilizing the air.

This invention provides improved control of sprayed evaporators for air conditioning. A car thermostat starts and stops the refrigerant compressor. The sprays operate continuously except when conditions are such that the indoor relative humidity rises, in which case the sprays are shut down. If the humidity continues to rise, refrigeration is supplied to the evaporators which affect dehumidification of the air. The compressor is shut down if conditions are right for forming ice on the coils, to interfere with air flow.

An object of the invention is to control temperature and humidity in an air conditioning system.

Another object of the invention is to prevent the formation of ice upon sprayed evaporator coils.

Other objects of the invention will be apparent from the following description and from the drawing.

The invention will now be described with reference to the drawing which illustrates diagrmmatically one embodiment of the invention.

The air conditioner 5 contains the two groups 6 and 7 of evaporator coils, one group of coils being preferably arranged above the other. The coils receive refrigerant from the compressor 8, through the condenser 9, the expansion valves 10, the distributors 11 and tubes 12. The valve 13 controlled by the solenoid 14 is in the line to the lower group of coils for a purpose which will be explained in the following.

The pump 15 recirculates water from the sump 16 of the unit 5, through the header 17 and spray nozzles 18 which project spray water upon the coils 6 and 7 to wash them and to wash the air passing between the nozzles and the coils.

The three wire, two position thermostat 19 is connected in circuit by the wires 40, 41 and 42 with the compressor motor 20, the contacts of the relay 21 and the electric source 22 and functions to stop the compressor when the temperature has fallen to the desired point, and to start the compressor when the temperature again rises. The contacts of the relay are normally closed so that normally the relay does not interfere with the control by the thermostat 19, of the compressor. Its purpose and operation will be explained in the following.

The blower 23 draws recirculated air through the inlet 24, and outdoor air through the inlet 25, passes the mixed air through the sprays and over the coils 6 and 7 and then through the duct 26 into the passenger space.

The sprays are not controlled by the thermostat 19 and operate continuously to wash the air and the coils except when the relative humidity within the car rises. A rise in humidity is due chiefly to mild outdoor conditions when the thermostat 19 acts to keep the compressor idle a great portion of the time so that the coils 6 and 7 are not effective for dehumidifying the air. This happens on mild days and on hot days when clouds obscure the sun, or during summer rains. The thermostat 27 responsive to outdoor air changes can anticipate the rises in indoor humidity. It is a three wire, two step thermostat and is connected by the wires 30, 31, 45 and 46, in circuit with the electric source 22, the switch 28 and the pump motor 29 and acts first, when the outdoor temperature drops to a point which experience has shown would cause the car thermostat 19 to be idle for so long a period that the indoor relative humidity rises too high, to deenergize the pump motor 29 to stop the pump 15 and the sprays in the unit 5. If the outdoor temperature drops still further, the thermostat 27 which is connected by the wires 31, 32, 33, 34 and 47 in circuit with the electric source 22, the switch 28, the normally closed contacts of the relay 44, compressor motor 20 and solenoid 14, acts to start the compressor 8 to supply refrigeration to the unit 5 and to energize the solenoid 14 to close the valve 13 to shut the lower coils 7 out of service, so that the unit 5 acts at reduced capacity to dehumidify the air.

The thermostat 19 has a low limit control which acts to stop the compressor if the temperature of the air falls below a predetermined minimum, by closing a circuit including the wires 41 and 43, the electric source 22 and the winding of the relay 44 to cause the contacts of the relay 44 to open to deenergize the circuit including the thermostat 27, the compressor motor 20 and the electric source.

The hygrostat 35 may be provided in the passenger space to function in substitution for the thermostat 27 when conditions are such that the thermostat 27 cannot effectively prevent the indoor relative humidity from rising too high. The triple pole, double throw switch in such a case may disconnect the thermostat 27 and connect the hygrostat 35 in the circuits described in the foregoing. The hygrostat is a three wire, two step hygrostat and acts first if the indoor relative humidity increases above that desired, to de-energize the pump motor 29 and stop the sprays in the unit 5. Then if this is insufficient and the relative humidity rises further, the hygrostat acts to start the compressor 8 and to disconnect the coils 7 therefrom. It may be connected by the switch 28 in the above described circuits in which the thermostat 27 is described as connected.

Since the coils 6 and 7 are finned tubes on which water is sprayed, if the water freezes on the fins the air will be blocked. Accordingly, the thermostat 36 in the suction line of the upper coils 6 is connected in circuit with the windings of the relay 21 and acts to energize the relay 21 to open its contacts to disconnect the compressor motor 20 from the electric source 22, to prevent the formation of ice upon the fins of the tubes.

While one embodiment of the invention has been described for the purpose of illustration, it should be understood that other apparatus and arrangements of apparatus may be suggested by those skilled in the art without departure from the spirit of the invention.

What is claimed is:

1. An air conditioning system comprising evaporator coils arranged as air cooling coils, spray nozzles arranged to wash the air passing over said coils, and said coils, means for supplying a refrigerating fluid to said coils, a room thermostat for controlling the effectiveness of said means, a pump for supplying water to said nozzles, and a two step psychrometric control for preventing an undesired rise in relative humidity in the space supplied with conditioned air, said control functioning in a first step to decrease the volume of water supplied by said pump to said nozzles, and functioning in a second step to adjust said first mentioned means to supply refrigerating fluid to said coils.

2. An air conditioning system comprising evaporator coils arranged as air cooling coils, spray nozzles arranged to wash the air passing over said coils, and said coils, means for supplying a refrigerating fluid to said coils, a room thermostat for controlling the effectiveness of said means, a pump for supplying water to said nozzles, and an indoor, two step hygrostatic control for preventing an undesired rise in relative humidity in the space supplied with conditioned air, said control functioning in a first step to decrease the volume of water supplied by said pump to said nozzles, and functioning in a second step to adjust said first mentioned means to supply refrigerating fluid to said coils.

3. An air conditioning system comprising two groups of evaporator coils arranged as air cooling coils, spray nozzles arranged to wash the air passing over said coils, and said coils, means for supplying a refrigerating fluid to said coils, a room thermostat for controlling the effectiveness of said means, a pump for supplying water to said nozzles, and a two step psychrometric control for preventing an undesired rise in relative humidity in the space supplied with conditioned air, said control functioning in a first step to decrease the volume of water supplied by said pump to said nozzles, and functioning in a second step to adjust said first mentioned means to supply refrigerating fluid to one of said groups of coils.

4. An air conditioning system comprising two groups of evaporator coils arranged as air cooling coils, spray nozzles arranged to wash the air passing over said coils, and said coils, means for supplying a refrigerating fluid to said coils, a room thermostat for controlling the effectiveness of said means, a pump for supplying water to said nozzles, and an indoor, two step hygrostatic control for preventing an undesired rise in relative humidity in the space supplied with conditioned air, said control functioning in a first step to decrease the volume of water supplied by said pump to said nozzles, and functioning in a second step to adjust said first mentioned means to supply refrigerating fluid to one of said groups of coils.

5. An air conditioning system comprising evaporator coils arranged as air cooling coils, spray nozzles arranged to wash the air passing over said coils, and said coils, means for supplying a refrigerating fluid to said coils, a room thermostat for controlling the effectiveness of said means, a pump for supplying water to said nozzles, and a two step psychrometric control for preventing an undesired rise in relative humidity in the space supplied with conditioned air, said control functioning in a first step to decrease the volume of water supplied by said pump to said nozzles, and functioning in a second step to adjust said first mentioned means to supply refrigerating fluid to said coils, said room thermostat acting at a predetermined minimum temperature to disconnect said control from said first mentioned means.

6. An air conditioning system for conditioning outdoor and recirculated air, comprising evaporator coils arranged as air cooling coils, spray nozzles arranged to wash the air passing over said coils, and said coils, means for supplying a refrigerating fluid to said coils, means for passing outdoor air over said coils for conditioning, a room thermostat for controlling the effectiveness of said means, a pump for supplying water to said nozzles, and a thermostatic control exposed to outdoor air for preventing an undesired rise in relative humidity in space supplied with conditioned air when the condition of the outdoor air is effective to cause said rise, said control functioning to adjust said first mentioned means to supply refrigerating fluid to said coils, said room thermostat acting at a predetermined minimum temperature to disconnect said control from said first mentioned means.

7. An air conditioning system for a passenger vehicle comprising an air washer, means for supplying outdoor air into said washer for cooling, means for chilling water, means for supplying the chilled water to said washer, a room thermostat for controlling said water chilling means, and a two step thermostatic control exposed to outdoor air and functioning upon a decrease in the outdoor air temperature for decreasing in a first step the volume of water supplied by said supplying means to said washer, and upon a further decrease in outdoor temperature for increasing in a second step the effectiveness of said water chilling means.

8. An air conditioning system for a passenger vehicle comprising two groups of evaporator coils arranged as air cooling coils, spray nozzles arranged to wash the air passing over said coils, and said coils, means for supplying a refrigerating fluid to said coils, means for passing outdoor air over said coils for conditioning, a room thermostat for controlling the effectiveness of said first mentioned means, a pump for supplying water to said nozzles, and a two step thermostatic control exposed to outdoor air for preventing an undesired rise in relative humidity in the space served when the temperature of the outdoor air falls to a predetermined point, said control functioning in a first step to decrease the volume of water supplied by said pump to said nozzles, and functioning in a second step upon a further fall in outdoor temperature to adjust said first mentioned means to supply refrigerating fluid to one of said groups of coils.

9. An air conditioning system for a passanger vehicle comprising an air washer, means for chilling water, means for supplying the chilled water to said washer, and a thermostatic control exposed to outdoor air for adjusting said supplying means for decreasing the volume of water supplied to said washer and for increasing the effectiveness of said water chilling means upon a fall in the temperature of the outdoor air.

10. An air conditioning system for a passenger vehicle comprising an air washer, means for chilling water, means for supplying the chilled water to said washer, and a thermostatic control exposed to outdoor air for adjusting said water chilling means to decrease the temperature of the water upon a fall in the temperature of the outdoor air.

SAMUEL M. ANDERSON.